Nov. 11, 1941.     E. G. PANKOW     2,262,403
NONPRESSURE WATER HEATER
Filed May 8, 1940
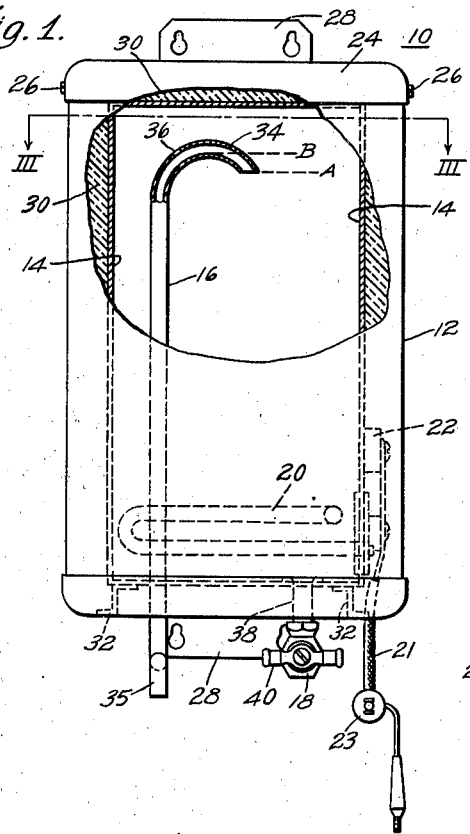
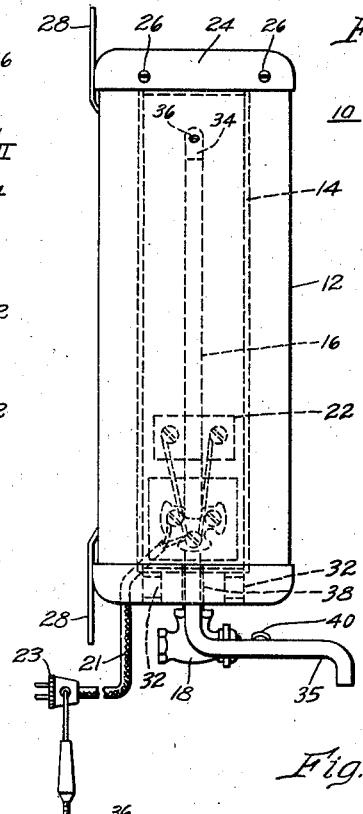
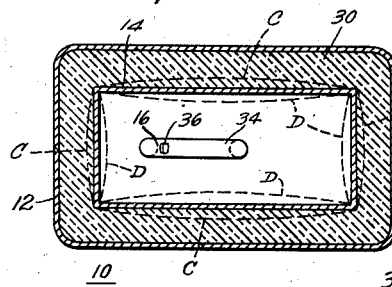
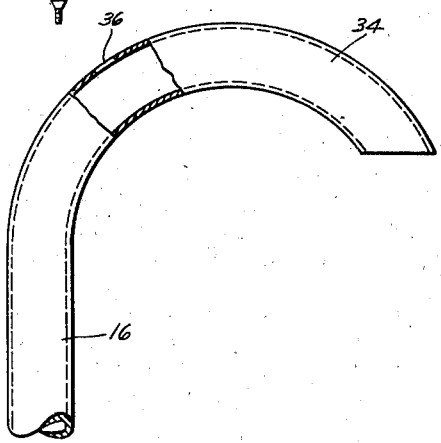
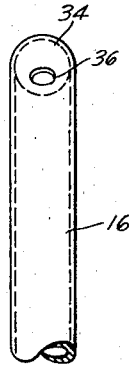
WITNESSES:
INVENTOR
Edmund G. Pankow.
BY
ATTORNEY Patented Nov. 11, 1941

2,262,403

UNITED STATES PATENT OFFICE 2,262,403

NONPRESSURE WATER HEATER

Edmund G. Pankow, Mansfield, Ohio, assignor to Westinghouse Electric & Manufacturing Company, East Pittsburgh, Pa., a corporation of Pennsylvania Application May 8, 1940, Serial No. 333,979

6 Claims. (Cl. 219—38)

My invention relates to water heaters and, more particularly, to a non-pressure water heater.

With non-pressure hot water tanks previously known to the art, there has been a serious operating problem of preventing dripping of water from the outlet pipe. Various unsuccessful attempts have been made to overcome this disagreeable condition. Inasmuch as the water level must be maintained below the "spillover line," a syphon-like outlet pipe is considered the most efficient and is generally used in combination with a pressure relief tube running from the air space above the water level to the atmosphere. This relief tube is used to prevent the building up of air pressure, during the heating of water, so as to prevent such water from being forced over the syphon.

However, at times of continued use or flow of water through the tank, the air in the top of the tank is forced out and water flows from the relief tube as well as the outlet tube. Accordingly, the relief tube must be relatively long and have a lower opening near the outlet tube so as to permit the water flowing therefrom to be near that leaving such outlet tube.

However, since water normally enters the tank faster than it can flow out, the water level rises above the top of the relief tube thereby shutting off the air escape and compressing the entrapped air in the top of the tank. This air pressure builds up until a balance is reached between the inflow and outflow of water.

When the inlet valve of tanks having such a structure is closed, the flow of water into the tank is stopped. Due to the air pressure within the tanks, the water flow continues until the water level drops to the level of the upper end of the relief tube. The flow stops momentarily until the relief tube is cleared of water, and then the syphonizing action starts, lowering the water level to the upper end of the outlet pipe. With the water being located at the upper end of the outlet pipe, it is then free to overflow and drip from such pipe. This undesirable dripping action is quite frequently apparent during the continued operation of such water heaters.

In order to overcome this disagreeable action I have found that, by using the well known syphon with a small hole in the upper curved portion thereof in combination with a flexible-sided water container or tank, there is a cooperative action between such syphon and container which permits an inrush of air and insures a water level below the normal "spill-over" line upon discontinuing a flow of water through such container.

It is, therefore, an object of my invention to provide a non-pressure water container or tank utilizing a syphon-type outlet having means associated therewith which will permit the ready passage of air into the tank upon stopping the flow of water therethrough whereupon such outlet will syphon the water below the normal "spill-over" line.

Another object of my invention is to provide a flexible-walled water tank having a syphon-like outlet pipe which cooperates with the outlet pipe to establish a water level somewhat below the "spill-over" point during the normal operation of such tank to prevent any dripping of the water, due either to normal expansion of water or expansion of air during the subsequent reheating period.

A further object of my invention is to provide a water tank having a flexible-walled container and a syphon-like outlet tube having a relatively small aperture in the upper end which cooperates with the flexible walls to maintain a normal water level well below the overflow point to prevent any dripping thereof during the normal operation of such device.

Other objects of my invention will either be pointed out specifically in the course of the following description of a device embodying my invention, or will be apparent from such description.

In the accompanying drawing:

Figure 1 is an elevational and partial fragmentary sectional view illustrating the device embodying my invention;

Fig. 2 is a side elevational view of the device shown in Fig. 1;

Fig. 3 is a view taken along the line III—III of Fig. 1 illustrating the device in its various operating positions;

Fig. 4 is an enlarged partial elevational view of a portion of the device embodying my invention; and Fig. 5 is a side elevational view of the member shown in Fig. 4.

Referring to the accompanying drawing, I show a non-pressure water heater 10 comprising an exterior housing 12, an inner water vessel or tank 14, an outlet pipe 16, an inlet valve 18, a water heating element 20, and a thermostat 22.

The housing 12 is preferably formed of a light sheet metal into substantially a rectangular parallel-epipedal shape having an open top. A suitable inverted dish-shaped member 24 formed of a similar sheet metal material is formed to fit over and cover the top of the housing 12. The dish-shaped member is rigidly attached to the housing 12, say by means of screws 26. Suitable bracket-like members 28 are rigidly attached to the rear surface of the housing 12 to afford means for mounting the water heater upon a wall or suitable supporting structure. The container or exterior housing 12 is somewhat larger than the inner water container or tank 14 to permit a suitable amount of loosely compacted insulating material 30 such as rockwool or the like to be placed therebetween. The insulating material is adapted to insulate the water tank 14 from the outer housing 12 and to prevent the loss of heat therethrough in a well known manner.

The inner vessel or tank 14 is likewise formed into substantially a rectangular parallelepipedal shape. However, the water tank 14 is formed of, say, relatively thin sheet copper or the like, so as to have flexible flat side portions. It is to be understood that while such side portions are flexible, they have sufficient strength to support and retain the quantity of water adapted to be positioned therein. The water tank 14 is supported upwardly from the bottom portion of the housing 12 by means of suitable Z-shaped brackets 32 or the like. This construction permits the insulating material 30 to be equally positioned about all sides of the tank 14 to adequately insulate it.

The outlet pipe 16 comprises a syphon-like end portion 34 located at the upper end thereof, and an outwardly extending faucet portion 35 located at the outer end thereof. The pipe 16 is adapted to extend substantially vertically within the water tank 14 and the syphon portion thereof is adapted to be located relatively near the top of such tank. The pipe 16 is formed of any suitable material such as copper tubing, or the like.

A relatively small aperture 36 is formed within the upper portion of the syphon-like end portion 34 of pipe 16 to cooperate with the flexible side portions of the water tank 14, as hereinafter described. The aperture 36 is substantially in line with or slightly above the "spill-over" line B (see Fig. 1). The aperture 36 must be considerably smaller in diameter than the diameter of the outlet pipe 16 to permit said structure to function properly as hereinafter described.

The inlet valve 18 is rigidly attached to the water container 14 by means of a suitable nipple or pipe connection 38 to permit the flow of water into the container 14 from a suitable water supply, not shown. The valve 18 may be of any well known structure and has an operating handle 40 to permit an operator to selectively open or close such valve.

The water heating element 20 is, in this instance, a U-shaped tubular immersion-type heating element which is operatively associated with a suitable electrical power supply (not shown) through the flexible cord 21 and plug 23. However, such heater may be of any other desired or suitable structure which is capable of maintaining a desired temperature of the water retained within the tank 14.

The thermostat 22 may be of any desired type which is capable of maintaining a desired temperature of the water therein. In other words, the thermostat is electrically associated with the heating element 20 and is adapted to selectively energize and deenergize such heating element so as to maintain any desired average temperature of the water, in accordance with a familiar practice. The thermostat 22 is illustrated in Figs. 1 and 2 as being positioned against the side walls of tank 14. However, it may be located in any desired position so to maintain the desired water temperature.

During the operation of the water heater the normal level of the water retained within the tank 14 is substantially within the zone indicated by horizontal lines A and B (see Fig. 1). When it is desired to drain off or obtain a portion of heated water from the heater 10, the valve 18 is opened whereupon cold water enters the tank 14. The upper level of the water within the tank 14 is then raised due to such inrush of water through inlet pipe 38. As the level of the water raises, the air in the upper portion of the tank 14 is forced out through aperture 36 and down through pipe 16. As the water continues to enter the tank 14, the water level continues to rise until it reaches the "spill-over" line B (see Fig. 1) at which time the water will begin to flow through the outlet pipe 16. With the continued inrush of water the aperture 36 becomes completely covered preventing the escapement of air therethrough. However, the water continues to rise within the tank 14, compressing the air remaining above the level of the aperture 36. This air is compressed until there is a steady flow of water through the tank 14 or, in other words, until the quantity of water leaving the tank is equal to that entering the tank.

The relatively flat side walls of the tank 14 are then expanded or bulged outwardly due to the increased pressure within such tank. This outward bulging of the tank side walls is illustrated by dotted lines C in Fig. 3.

After having discharged the desired quantity of hot water from the water tank 10, the valve 18 is closed by the operator. The flow of water into the tank 14 is stopped. However, the flow of water out through the outlet pipe 16 continues. This outward flow of water continues because the compressed air within the upper portion of the tank 14 expands, forcing such water out through the pipe 16. As the water level lowers and reaches the aperture 36 in the syphon-like portion 34 of pipe 16, the pressure within the tank 14 is substantially equal to the atmospheric pressure. The side walls of the tank 14 are then substantially flat or in their normal position.

However, when the water reaches such a level the syphon begins to function, syphoning the water out of the tank 14. This action produces a vacuum on the tank until the weight of the water column within the outlet pipe plus the absolute pressure of the entrapped air within the tank 14 are equal to the atmospheric pressure, at which time the flow of water out through the outlet pipe ceases. The aperture 36, being relatively small with respect to the diameter of the outlet pipe 16, does not break the syphon action.

The flexible walls of tank 14 will be concaved or partially collapsed inwardly due to the vacuum developed within the tank 14 during the syphoning of the water out of such tank. This inward position is illustrated by dotted lines D in Fig. 3. The water level will at this time be higher for a given quantity of water within such tank than it would normally be if such side walls were parallel to each other or in their normal position.

As the flow stops due to the equalizing of pressures as hereinbefore described, the outlet pipe is cleared of water. This permits air to be admitted to the tank, by way of the aperture 36, returning the pressure therein to that of the atmosphere. The walls of the container are thus free to return to their normal (solid-line) position. Accordingly, inasmuch as when the water ceased flowing out of the outlet pipe, the walls were concaved inwardly, and inasmuch as the volume of such water remains constant when such walls return to their normal or parallel position, the upper level of the water drops to its normal position substantially below the "spill-over" line B, to a point within the zone indicated by such line B and line A, (see Fig. 1).

It is, therefore, obvious that the flexible side walls of the tank 14 functioning in combination with the cooperative action of the aperture 36 reduces the volume of the water retained within the tank or container just prior to the stopping of the syphoning action, and upon returning to their normal positions automatically lower the level of such water upon the stopping of such syphoning action. It is further obvious that due to the structure embodying my invention, a non-pressure water tank will be free of any dripping action without the need of a relief tube due to the cooperative action between such flexible sides and apertured syphon-like outlet pipe embodying my invention.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim as my invention:

1. A water heater including a tank having upstanding sides and an outlet pipe, said outlet pipe having a syphon-like end disposed within the tank with an aperture positioned in the upper portion thereof, at least one side of said tank being flexible so as to cooperate with the aperture to maintain a normal water level below that otherwise obtainable by said syphon-like outlet pipe.

2. A non-pressure water tank comprising a flexible-walled container, an outlet pipe having a syphon-like end disposed within the tank and having an aperture positioned within the upper portion of the pipe to permit the passage of air into such tank, said flexible walls cooperating with the pipe to aid in the flow of water from the tank and to maintain the level of water therein below the overflow position when the flow of water through the container is discontinued.

3. In a non-pressure water heater including a rectangularly shaped container having flexible sides, an outlet pipe having a syphon-like end disposed within the container with a relatively small aperture positioned in the upper portion thereof, and means for connecting such container to a water supply, the flexible sides in combination with the cooperative action of the aperture partially collapsing to reduce the volume of water retained within the container just prior to the stopping of a syphoning action and then automatically moving towards a normal flat condition to lower the level of the water upon the stopping of such syphoning action.

4. In a non-pressure water heater including a rectangularly shaped container having flexible sides, an outlet pipe having a syphon-like end disposed within the container with a relatively small aperture positioned in the upper portion thereof, and means for connecting such tank to a water supply, the level of the water being above the aperture during the normal flow of water through the container at which time said container side walls expand outwardly, such water level beginning to drop upon discontinuing the flow of water into the tank until it reaches the aperture at which time the syphoning action begins, the side walls then concaving inwardly until the flow of water through the outlet tube is stopped to admit air to the container, whereupon the side walls automatically expand out to their normal position lowering the level of the water to prevent any dripping thereof.

5. In a water heater, a container having a flexible wall, outlet means having an apertured syphon structure at one end disposed within said container, and means for connecting said container to a water supply, the flexible wall in cooperation with the apertured syphon structure partially collapsing to reduce the volume of water retained within the container just prior to the stopping of a syphoning action and then automatically moving towards a normal position to lower the level of the water upon the stopping of such syphoning action.

6. In a liquid heater, a container having a flexible wall portion, outlet means having a syphon structure with an air-passing aperture positioned above the normal "spill-over" level in said container, and means for connecting said container to a liquid supply, the flexible wall portion moving inwardly in response to a partial vacuum caused by the syphoning action of said syphon structure at the end of a discharge of liquid through said outlet means, thereby to reduce the volume of liquid retained in said container, said flexible wall portion then automatically moving towards a normal position as air enters the container through said outlet means and apertured syphon structure thereby to lower the level of the liquid below said "spill-over" level.

EDMUND G. PANKOW.